US007499558B2

(12) United States Patent
Holton

(10) Patent No.: US 7,499,558 B2
(45) Date of Patent: Mar. 3, 2009

(54) DIGITAL MIXER

(75) Inventor: Terry Holton, West Sussex (GB)

(73) Assignee: Yamaha Corporation, Hamamatsu-Shi (JP)

( * ) Notice: Subject to any disclaimer, the term of this patent is extended or adjusted under 35 U.S.C. 154(b) by 588 days.

(21) Appl. No.: 10/925,093

(22) Filed: Aug. 23, 2004

(65) Prior Publication Data

US 2005/0055117 A1 Mar. 10, 2005

(30) Foreign Application Priority Data

Sep. 9, 2003 (GB) ................................ 0321102.6

(51) Int. Cl.

| | |
|---|---|
| ***H04B 1/00*** | (2006.01) |
| ***H04B 1/20*** | (2006.01) |
| ***G10H 1/00*** | (2006.01) |
| ***G06G 17/00*** | (2006.01) |

(52) U.S. Cl. ......................... 381/119; 381/118; 700/94; 369/4

(58) Field of Classification Search ..................... 369/4; 381/119, 118; 700/94

See application file for complete search history.

(56) References Cited

U.S. PATENT DOCUMENTS

| | | | |
|---|---|---|---|
| 5,778,417 | A | 7/1998 | Kentish et al. |
| 5,940,521 | A | 8/1999 | East et al. |
| 2002/0188364 | A1 | 12/2002 | Ota et al. |

FOREIGN PATENT DOCUMENTS

| | | |
|---|---|---|
| JP | 2003-102098 | 4/2003 |
| WO | WO 99/37046 | 7/1999 |

OTHER PUBLICATIONS

Owner's Manual for Digital Production Console DM 2000, Yamaha Corporation, Pro Audio & Digital Musical Instrument Division, 361 pp.

*Primary Examiner*—Vivian Chin
*Assistant Examiner*—George C Monikang
(74) *Attorney, Agent, or Firm*—Morrison & Foerster LLP

(57) ABSTRACT

A digital mixer includes a plurality of channel strips respectively having rotary encoders in a console, stores a plurality of layers that determine assignments of a channel to each of the channel strips, and assigns a channel to each of the channel strips in accordance with a layer selected among the plurality of layers. Further, the digital mixer is configured to be able to assign to each of the rotary encoder a parameter of a channel assigned to a channel strip to which the rotary encoder belongs in a reverse layer of a selected layer, assuming that there is an obverse-reverse correspondence between a (2n−1)-th and a 2n-th layer among the plurality of layers for a natural number n, and to change the value of the parameter in accordance with operation of the rotary encoder.

3 Claims, 5 Drawing Sheets

DIGITAL MIXER

BACKGROUND OF THE INVENTION

1. Field of the Invention

The present invention relates to a digital mixer which processes audio signals and, more particularly, to a digital mixer in which channel strips having rotary encoders are provided in a console.

2. Description of the Related Art

Conventionally, there has been a known digital mixer that processes audio signals inputted through a plurality of input channels and outputs them from a plurality of output channels. Such a digital mixer is generally provided with channel strips for setting parameters of respective channels for signal processing.

This channel strip includes controls such as a slider, a rotary encoder, and keys or buttons, which are different depending on the performance and price of digital mixers, to function as a control group for controlling parameters of a channel assigned thereto.

Besides, since the number of kinds of controllable parameters is greater than the number of controls included in the channel strip, it has been widely performed to selectively assign parameters to the rotary encoder and allow the rotary encoder to function as a control for controlling the assigned parameter of a channel assigned to the channel strip, so that a plurality of parameters are made controllable by one rotary encoder. On the other hand, the setting of the volume of each channel is frequently changed, and therefore there is a strong demand for easy changeability of the setting. Hence, to meet the demand, it is common to allow a slider to function as a fader that is a volume control.

A plurality of channel strips are often provided side by side to make it possible to control parameters of a plurality of channels at the same time. It is difficult, however, to provide channel strips as many as channels the digital mixer handles. Hence, it is actually performed to prepare a plurality of layers that determine assignments of a channel to each of channel strips, and selectively switch the layers to switch assignments of a channel to each of the channel strips, thereby enabling parameters of a number of channels to be controllable using relatively few channel strips.

Further, since the digital mixer handles signals in pairs as L-, R-signals for a stereo, there is a demand for linked control of some parameters of two channels. Accordingly, it is performed to make a pair of channels which are assigned to a (2n−1)-th channel strip and a 2n-th channel strip where n is a natural number, and when a parameter of one of the paired channels is changed, the parameter of the other channel is changed in conjunction therewith, as for some parameters of a compressor, an equalizer, a volume level, and so on.

As a method of setting pairs, there is another method in use which makes a pair of a channel that is assigned to a channel strip in a (2n-1)-th layer and a channel that is assigned to the same channel strip in a 2n-th layer. This method enables the parameters of the paired two channels to be controlled by one channel strip, thus providing efficient use of channel strips. When the channels of the adjoining layers are paired, these layers are said to be in an obverse-reverse correspondence, and when one of the layers is selected, the selected layer is called an obverse layer, and the other layer is called a reverse layer.

In such a background, the channel corresponding to a channel strip in the obverse layer and the channel corresponding to the same channel strip in the reverse layer are in a correspondence for a user to be easily recognized. Therefore, there has been a demand for simultaneous control of the parameters of these channels by controls included in one channel strip. Further, this demand is particularly strong for volume setting.

For example, when recording is performed with a multi-track recorder being connected to a digital mixer, it is demanded to adjust parameters by one track and send them to the recorder, input signals which are returned by the recorder for verification into the channel in the reverse layer, and adjust the signals in level to the volume for easy listening and monitor them.

A conventional digital mixer, however, has a problem that controls of each channel strip can control only parameters of a channel which is assigned to the channel strip and therefore fails to meet such demands. This is true even in a case where the parameters can be selectively assigned to the controls.

SUMMARY OF THE INVENTION

It is an object of the invention to solve such problems and improve the operability of the digital mixer.

To attain this object, the invention is a digital mixer in which a plurality of channel strips respectively having rotary encoders are provided in a console, including: a first assignor which stores a plurality of layers that determine assignments of a channel to each of the channel strips, and assigns a channel to each of the channel strips in accordance with a layer selected among the plurality of layers; a second assignor which assigns to the rotary encoder a parameter of a channel assigned to a channel strip to which the rotary encoder belongs; a third assignor which assigns to the rotary encoder a parameter of a channel assigned to a channel strip to which the rotary encoder belongs in a reverse layer of a selected layer, assuming that there is an obverse-reverse correspondence between a (2n−1)-th and a 2n-th layer among the plurality of layers for a natural number n; and a parameter editor which changes a value of a parameter assigned to the rotary encoder in accordance with operation of the rotary encoder.

Further, the invention is a digital mixer, comprising: a plurality of channel strips for controlling respective channels, each strip including a parameter encoder for varying a parameter of the respective channel or channels; a first assignor storing a plurality of layers for assigning a channel to each of the channel strips in accordance with a selected layer from among the plurality of layers; a second assignor for assigning a parameter of a channel to the parameter encoder of the channel strip to which the channel is assigned; a third assignor for assigning a parameter of a channel of a reverse layer to the parameter encoder of a channel strip assigned to a corresponding channel in the selected layer when the reverse layer and selected layer are in an obverse-reverse relationship; and a parameter editor changing the parameter assigned to the parameter encoder in accordance with operation of the parameter encoder.

In such a digital mixer, it is preferable that the parameter encoder is a rotary encoder. Further, it is also preferable that the obverse-reverse relationship occurs between a (2n−1)-th and 2n-th layer where n is a natural number.

The above and other objects, features and advantages of the invention will be apparent from the following detailed description which is to be read in conjunction with the accompanying drawings.

DETAILED DESCRIPTION OF THE PREFERRED EMBODIMENTS

Hereinafter, a preferred embodiment of the invention will be explained in detail with reference to the attached drawings.

Figure 1:
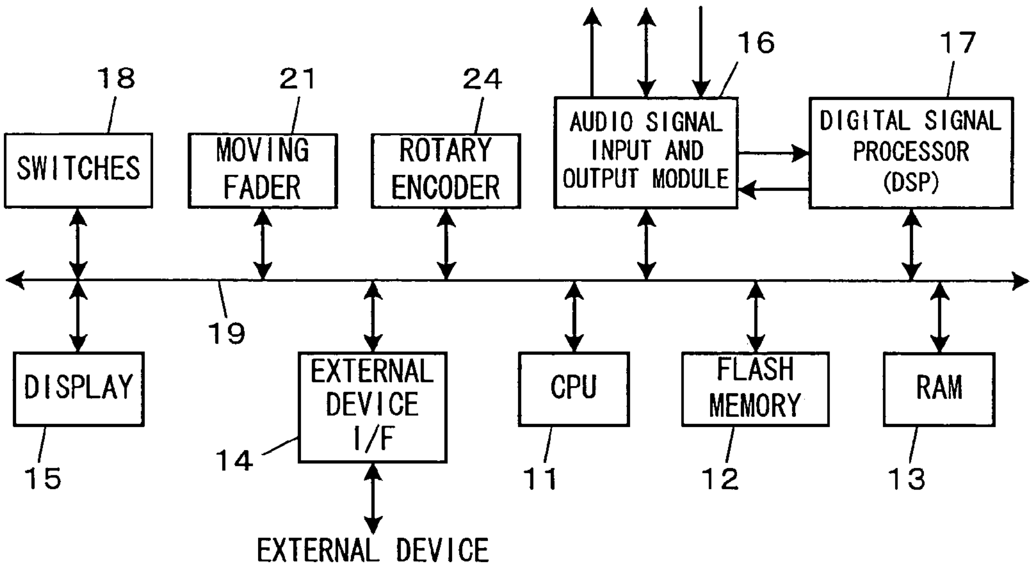
FIG. 1 is a block diagram showing a configuration of a digital mixer being an embodiment of the invention.

FIG. 1 is a block diagram showing a configuration of a digital mixer being an embodiment of the invention. As shown in FIG. 1, this digital mixer (hereinafter, also referred to only as a "mixer") includes a CPU 11, a flash memory 12, a RAM 13, an external device interface (I/F) 14, a display 15, an audio signal input and output module 16, a digital signal processor (DSP) 17, switches 18, moving faders 21, and rotary encoders 24, which are connected by a system bus 19. The digital mixer has a function of performing various kinds of signal processing for inputted audio signals and outputting the audio signals.

The CPU 11, which is a controller that comprehensively controls operation of the whole mixer, executes a predetermined program stored in the flash memory 12 to detect operations of the switches 18, the moving faders 21, and rotary encoders 24 and change parameter values in accordance with the operations, and to control the operation of the DSP 17 in accordance with set parameters.

The flash memory 12 is a rewritable non-volatile memory that stores a control program and so on executed by the CPU 11.

The RAM 13 is a memory that stores setting contents of various kinds of parameters and is used as a work memory of the CPU 11.

The external device I/F 14 is an interface for transferring information with external devices such as a personal computer and the like connected to the mixer.

The display 15, which is a display provided on a console of the mixer and composed of a liquid crystal display (LCD) or the like, displays a screen for referring to and changing, storing, and so on of setting, an operation status of the mixer, and so on.

The audio signal input and output module 16 is an interface for receiving input of audio signals to be processed in the DSP 17 and outputting processed audio signals. A plurality of A/D conversion boards each capable of analog input of four channels, D/A conversion boards each capable of analog output of four channels, and digital input and output boards each capable of digital input and output of eight channels, can be installed in combination into the audio signal input and output module 16, which actually inputs and outputs signals through the boards.

The DSP 17 is a module that processes audio signals inputted from the audio signal input and output module 16 in accordance with the set values of various parameters. The processing will be described later in detail.

The switches 18, moving faders 21, and rotary encoders 24 are controls provided on the console of the mixer for a user to set parameters on processing of audio signals. The moving faders 21 among them are slider controls having a motor, so that their knobs are movable to designated positions also by a direction from the CPU 11. The rotary encoder 24 have a function of detecting the rotation amounts of their knobs as manipulation amount. The switches 18 denote various kinds of controls other than the moving faders 21 and rotary encoders 24 provided on the console.

Figure 2:
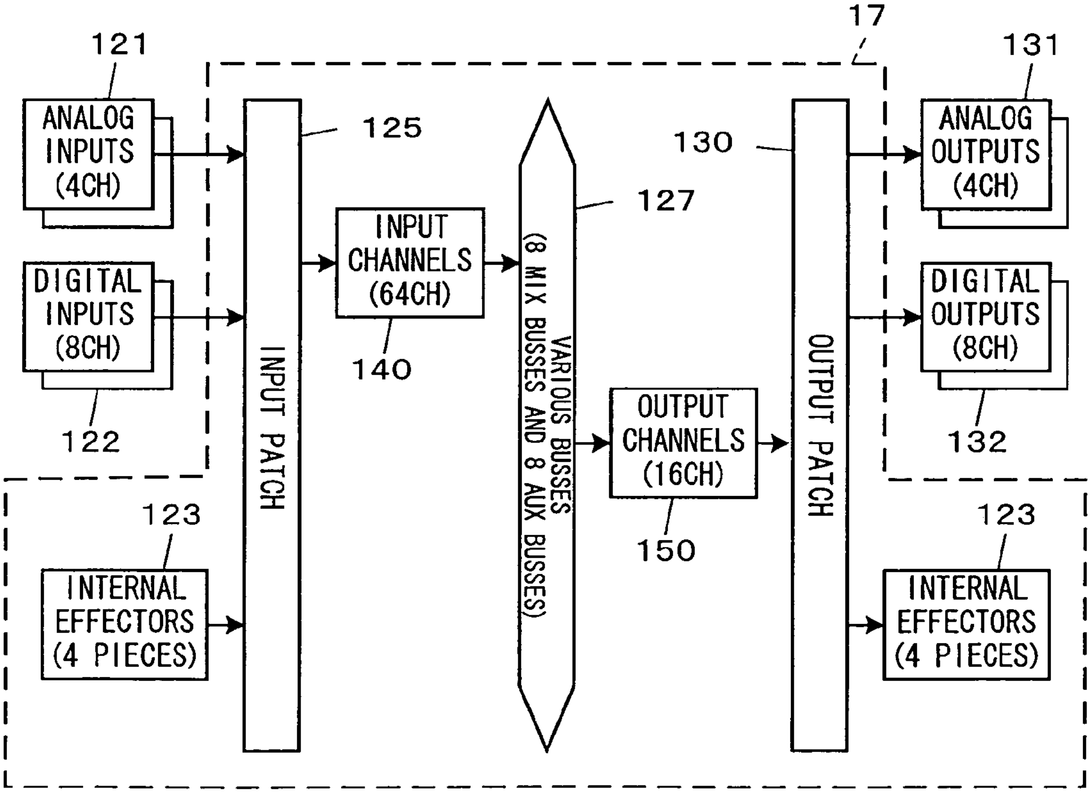
FIG. 2 is a block diagram showing in more detail the configuration of the DSP shown in FIG. 1.

Mixing processing in the DSP 17 includes, as shown in FIG. 2, internal effectors 123, an input patch 125, input channels 140, various busses 127, output channels 150, and an output patch 130. Analog inputs 121, digital inputs 122, analog outputs 131, and digital outputs 132 represent input and output channels implemented by the above-described boards to be installed into the audio signal input and output module 16.

The internal effectors 123 are composed of plural blocks of effectors that apply selected effects to inputted signals and output the signals. The channel configuration of the internal effector 123 is changeable between monaural, stereo, and so on.

The input patch 125 performs optional patch for assigning signals inputted from the inputs of the analog inputs 121 and digital inputs 122, and the internal effectors 123 to the input channels 140 having 64 channels. Input signals allocated by the input patch 125 are inputted into respective input channels 140.

Figure 3:
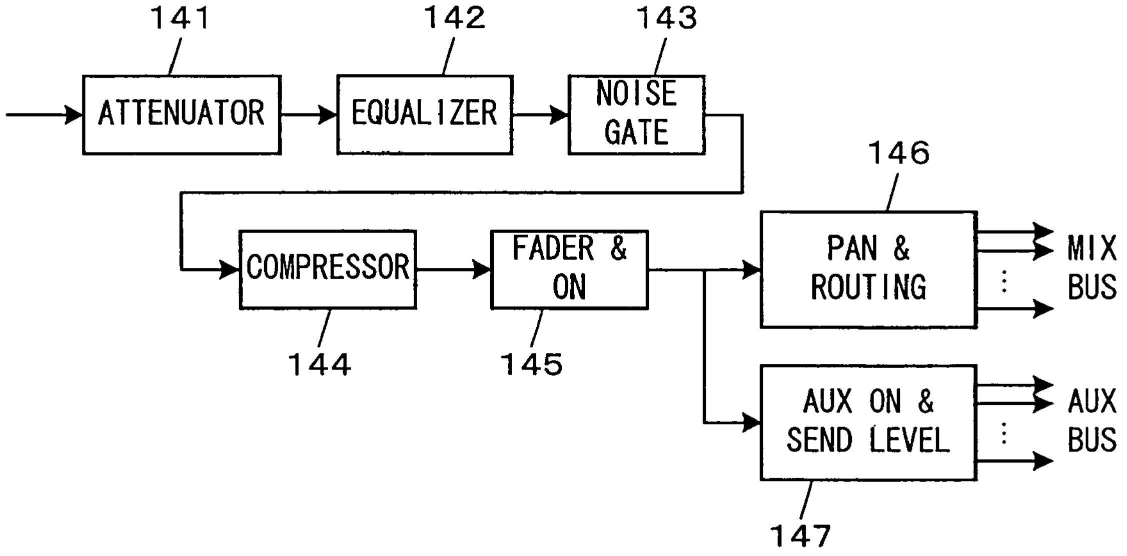
FIG. 3 is a block diagram showing in more detail the configuration of an input channel shown in FIG. 2.

Each of the input channels 140 includes, as shown in FIG. 3, an attenuator 141, an equalizer 142, a noise gate 143, a compressor 144, a fader & ON 145, a pan & routing 146, and an AUX ON & send level 147. The attenuator 141 is a module for adjusting the level of a signal to prevent clip and an excessive reduction in level of the signal, the equalizer 142 is a parametric equalizer with three bands of LOW, MID, and HIGH, the noise gate 143 is a gate for closing (cutting off a signal line) when the signal level drops to prevent noise from remaining, the compressor 144 is a module for performing automatic gain adjustment, and the fader & ON 145 is a module having a volume for level (sound level) adjustment and a function of setting ON/OFF of output.

In the input channel 140, these modules perform predetermined processing for inputted signals and output the processed signals to the various busses 127, and the signals are outputted to MIX busses through the pan & routing 146. This module is composed of a pan for setting the balance between right and left when outputting the signals to a stereo bus and a routing for setting the existence or absence of output to each bus. On the other hand, the signals are outputted to the AUX buses through the AUX ON & send level 147. This module is composed of an AUX ON for setting the existence or absence of output to each bus and a send level for setting the level of output to each bus.

Here, it is possible to output the signal from one input channel to plural busses, and also to output the signals from plural input channels to one bus. The signals inputted to the various busses 127 are outputted to corresponding output channels 150. In this event, the bus into which signals are inputted from plural input channels 140 performs mixing processing for these signals.

As regards output channels 150, sixteen channels are provided to correspond to the various busses 127 on a one-to-one basis. Each of the channels includes modules corresponding to the equalizer 142, the noise gate 143, the compressor 144, and the fader & ON 145 of the configuration of the input channel shown in FIG. 3. In the output channel 150, these modules perform predetermined processing for inputted signals and output the processed signals to the output patch 130.

The output patch 130 performs optional patch of allocating the signals inputted from the output channels 150 to outputs of the analog outputs 131 and digital outputs 132, and the internal effectors 123. The signal from one output channel can be allocated even to plural outputs. The signals allocated to the analog outputs 131 or digital outputs 132 are outputted therefrom, and the signals allocated to the internal effectors 123 are processed therein and then inputted again into the input patch 125.

It should be noted that the DSP 17 can also mix signals selected from the input channels 140 and the output channels 150 and output the mixed signal to an output for a monitor not shown.

These elements of the above-described DSP 17 may be realized by circuits or by arithmetic processing.

Figure 4:
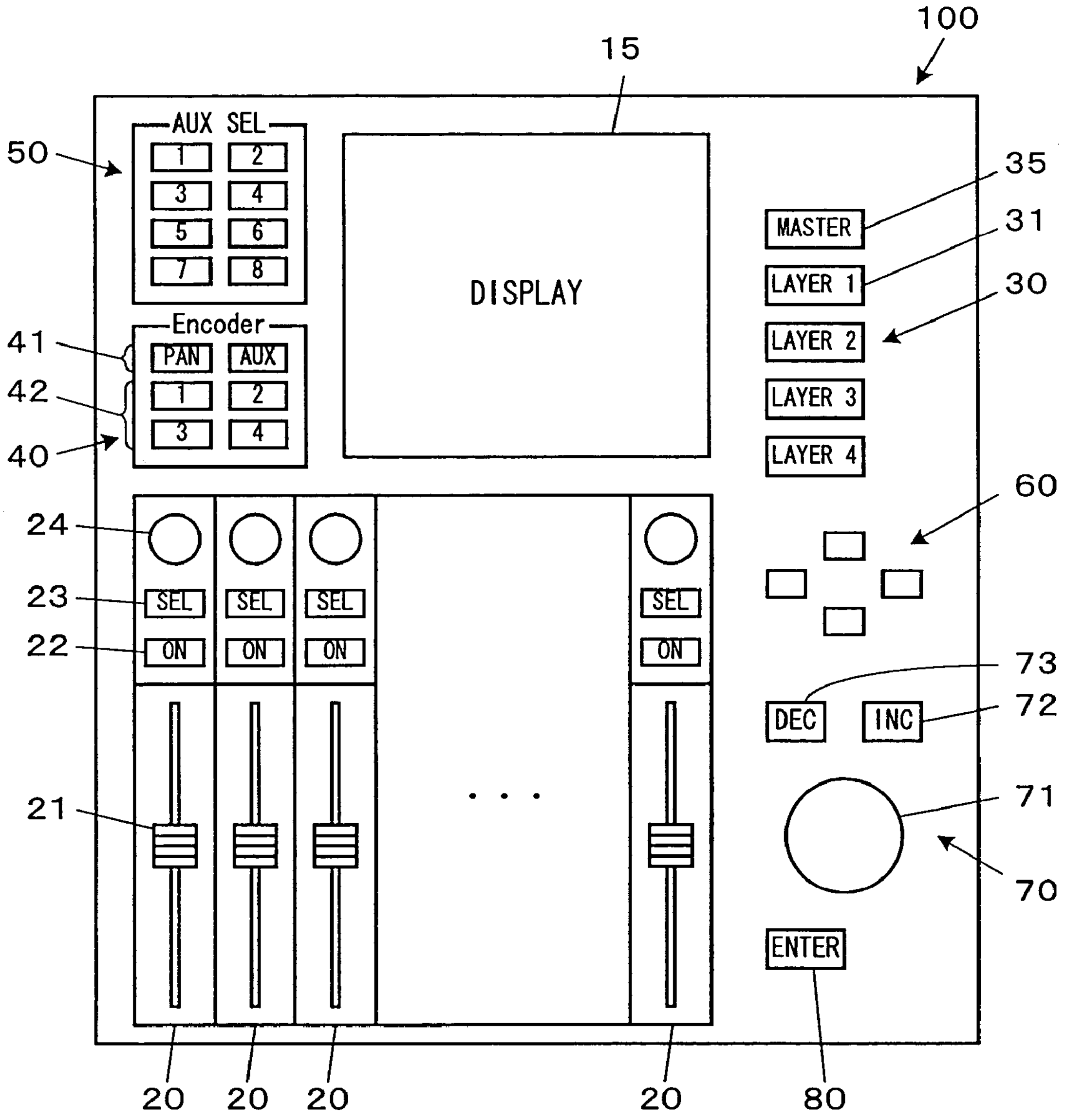
FIG. 4 is a view showing a schematic configuration of a console of the digital mixer shown in FIG. 1.

Next, a schematic configuration of a console of the digital mixer is shown in FIG. 4.

A console 100 including the display 15 is for directing change of parameters used in signal processing and so on in the DSP 17 and editing the parameters, by operating various controls while referring to the display screen displayed on the display 15.

As the controls for the operation, channel strips 20, a layer selection key group 30, an encoder function designation key group 40, an AUX bus selection key group 50, cursor controls 60, increase/decrease controls 70, and an enter key 80, are provided.

As for the channel strips 20, 16 channel strips 20 are provided here side by side. Each of the channel strips 20 includes the moving fader 21 for setting the output level, an on switch 22 for setting of ON/OFF, a selection switch 23 for selecting a corresponding channel, and the rotary encoder 24 to which a parameter is assigned and which is used for controlling the parameter as described later. If there is no problem in terms of cost and space, additional controls and rotary encoders corresponding to other parameters may be provided.

To each of the channel strips 20, any one of the input channels 140 and output channels 150 shown in FIG. 2 is assigned, and the controls of the channel strip 20 basically function as controls for controlling parameters of the channel and setting their values. It should be noted that making exceptions to the above is a feature of the invention and will be described later.

Assignment of channels to the channel strips 20 is performed using layers. The layer is for determining an assignment of channels to the respective channel strips 20 (here first, second, . . . , and n-th from the left side in order), and a plurality of layers are determined and stored in the flush memory 12 in advance. The assignment can be determined in such a manner that, for example, in a first layer a first to a 16th channel among the input channels 140 are assigned to the first to the 16th channel strip 20, in a second layer a 17th to a 32nd channel are assigned similarly, and in a third and a fourth layer a 33rd to a 48th channel and a 49th to a 64th channel are assigned similarly, respectively.

Each key of the layer selection key group 30 is a key for selecting a layer to assign channels to the channel strips 20. For example, a press of a layer 1 selection key 31 enables the first layer to be selected to assign the first to 16th input channels to the respective channel strips 20. Other layers can be selected by pressing other layer selection keys.

Further, a layer for assigning the output channels 150 is separately prepared as a master layer which is configured to be selectable by a master layer selection key 35. When this layer is selected, a first to a 16th output channel are assigned to the respective channel strips 20.

On the other hand, keys for assigning parameters to the rotary encoders 24 are keys of the encoder function designation key group 40. When one of the keys is pressed, a parameter corresponding to the key is assigned to the rotary encoder 24 of each channel strip 20, and therefore the key basically functions as a control for controlling the assigned parameter of the channel which is assigned to the channel strip 20 including the rotary encoder 24.

The keys of the encoder function designation key group 40 are broadly divided into fixed function keys 41 and assignable keys 42. The fixed function keys 41 are composed of a PAN key and an AUX key. These are keys for assigning the pan and AUX send level respectively. The AUX send level can be set for each AUX bus, and the parameter of the bus to be assigned is selected by each key of the AUX bus selection key group 50.

On the other hand, parameters can be assigned to the assignable keys 42 respectively. This operation can be performed on the screen displayed on the display 15, an example of the screen being shown in FIG. 5. An assignment setting screen 200 shown in this drawing displays a fixed function key display section 201, an assignable key display section 202, and a parameter selection section 203.

At the fixed function key display section 201, parameters assigned to the fixed function keys 41 are displayed. This assignment is fixed but displayed for verification. At the assignable key display section 202, parameters assigned to the assignable keys 42 are displayed. At the parameter selection section 203, a list of parameters that are assignable to the assignable keys is displayed.

When any of the assignable keys 42 is pressed during display of the assignment setting screen 200, a key number and the parameter assigned to the key are highlighted at the assignable key display section 202 and the parameter selection section 203 respectively. By selecting another parameter at the parameter selection section 203 and designating its assignment, the selected parameter can be assigned to the key.

Figure 5:
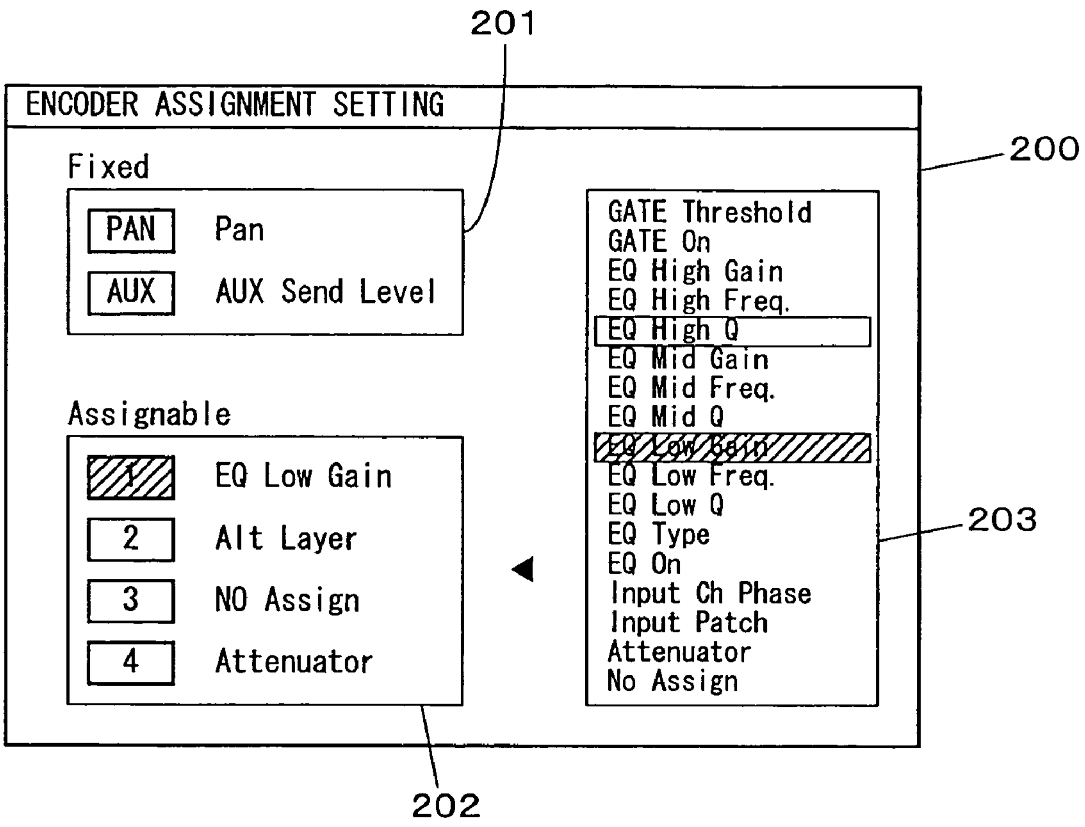
FIG. 5 is a view showing a display example of a screen for assigning parameters to assignable switches shown in FIG. 4.

FIG. 5 shows the state in which a first assignable key is pressed to highlight the parameter of the equalizer LOW band gain, and thereafter a cursor for selection is moved to the parameter of the equalizer HIGH band Q by the cursor controls 60. A press of the enter key 80 in this state produces a direction of an assignment of the equalizer HIGH band Q to the first assignable key. Note that the parameter selection section 203 is scrollable, and the kinds of parameters shown in the drawing are part of assignable ones.

After the assignment of the parameter on this screen, a press of any of the assignable keys 42 enables assignment of the parameter assigned to the key to the rotary encoder 24.

Returning to explanation of FIG. 4, the cursor controls 60 among the remaining controls are controls for operating the cursor displayed in the display screen (not limited to the assignment setting screen 200) of the display 15. The increase/decrease controls 70 are controls for increasing/decreasing the parameter displayed at the position of the cursor in the display screen. The increase/decrease controls 70 are composed of a rotary encoder 71, and an increase key 72 and a decrease key 73, either of which can be used to direct an increase or a decrease. A press of the enter key 80 after the setting of the increase or decrease enables the values after the change to be effective. Note that as for continuously changeable parameters, values after changes are made effective every time an increase or decrease is directed.

The parameters can be edited also by sequentially selecting parameters desired to be changed on the display screen of the display 15 and directing changes by means of the controls.

Through use of the console 100 provided with the above-described controls, it is possible to set a number of parameters which are necessary to permit the digital mixer to operate.

This mixer is characterized in the method of setting a parameter using the rotary encoder 24, in particular, of each channel strip 20, and therefore this point will be further described.

In this mixer, when detecting the occurrence of each event shown in Table 1, the CPU 11 sets a value corresponding to the event in a predetermined register as shown in Table 1. The registers shown in Table 1 are registers for setting data shown in Table 2.

First, processing when an assignment direction is made to an n-th assignable key will be described. This assignment direction is made on the assignment setting screen 200 shown in FIG. 5, and this direction is made with a key of an assignment target and the kind of parameter to be assigned to the key being designated.

Then, when this designation is made, for example, to the n-th assignable key, processing of setting the number of the parameter which is designated to be assigned in a register EA(n) which stores the number of the parameter assigned to the n-th assignable key, is performed. Here, the numbers of the parameters are determined to be 1 to 44 for respective assignable parameters as shown in Table 3. Further, number 0 indicating that nothing is assigned thereto and the numbers corresponding to the AUX send level and pan that are assigned to the fixed function keys 41 are also prepared.

The invention is characterized in that "Alt Layer" at number 43 is provided in choices of the parameters. This "Alt Layer" indicates a parameter of a channel other than channels assigned to the channel strips 20. Here, among parameters of the channel to be assigned to the channel strip 20 to which the rotary encoder 24 belongs in the reverse layer of a selected layer, a parameter of the fader is assigned. As for obverse and reverse of layers, it is determined that there is an obverse-reverse correspondence between a (2n−1)-th and a 2n-th layer among the above-described layers where n is a natural number. The significance of the determination is as in the description of the conventional mixer.

Besides, assignment of the parameter to the rotary encoder 24 is made when any of the keys of the encoder function designation key group 40 is pressed. In this case, the CPU 11 sets in a register EAN, when any of the fixed function keys 41 is pressed, the number indicating a fixed parameter, and when any of the assignable keys 42 is pressed, the number indicating a parameter assigned to the key. When the number set at this time is other than 43 (a parameter to be assigned is other than Alt Layer), the CPU 11 assigns to each rotary encoder 24 a parameter of a channel assigned to the channel strip 20 to which the rotary encoder 24 belongs, and therefore the CPU 11 functions as a second assignor. On the other hand, when the number set in the register EAN is 43, a parameter in a reverse layer is assigned as described above, and therefore the CPU 11 functions as a third assignor.

Further, when any of the keys of the layer selection key group 30 is pressed, the CPU 11 sets the number of the layer selected by the key in a register LN, thereby assigning a channel to each of the channel strips 20. In this processing, the CPU 11 functions as a first assignor.

Figure 6:
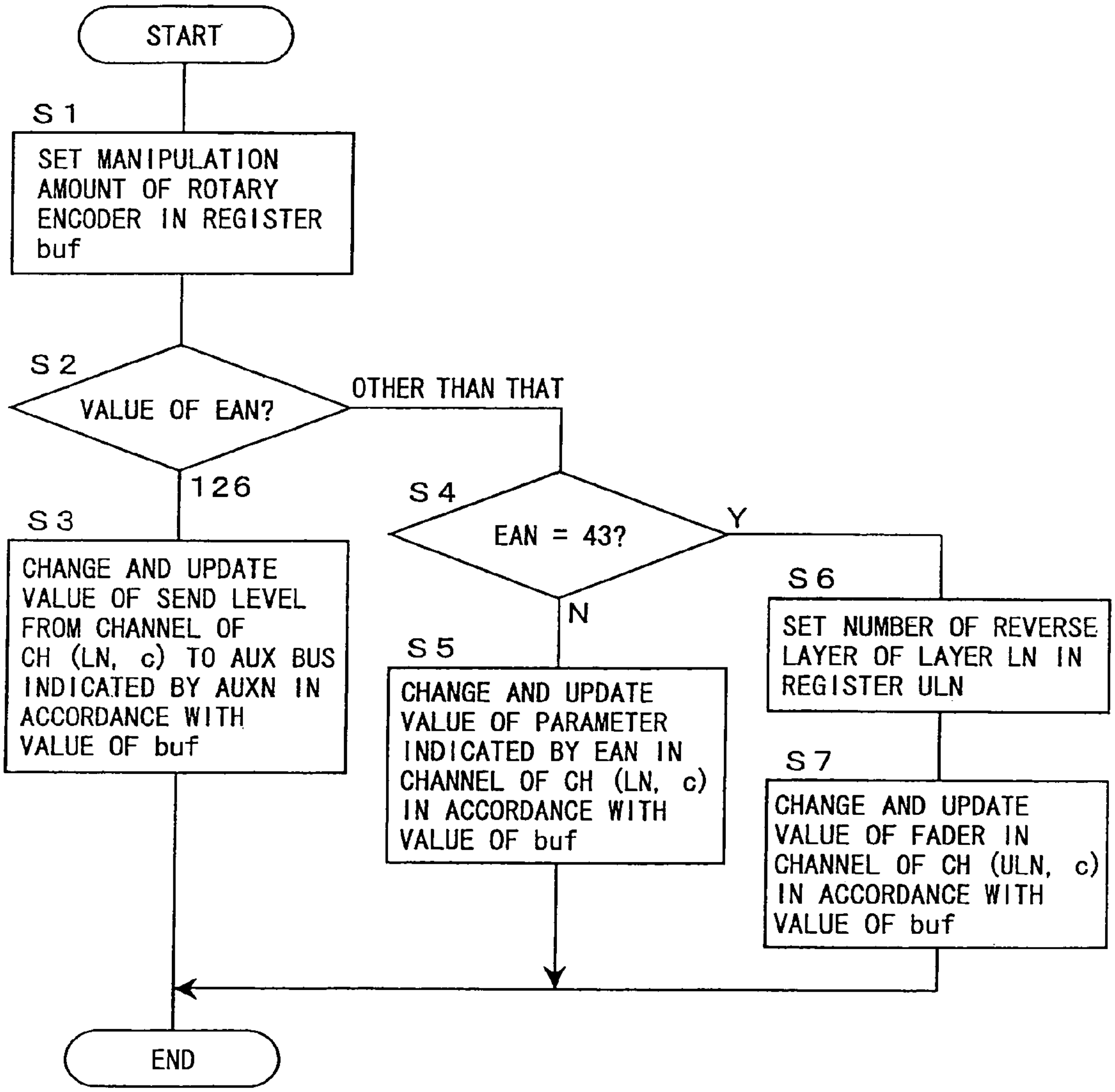
FIG. 6 is a flowchart showing processing when a rotary encoder of any of the channel strips shown in FIG. 4 is operated.

Next, processing when the rotary encoder 24 is operated will be described. This processing is shown in FIG. 6, and the CPU 11 starts the processing shown in FIG. 6 when the rotary encoder 24 of any of (here, a c-th) the channel strips 20 is operated.

In this processing, first, in step S1, the manipulation amount of the rotary encoder is set in a register buf. Then, when the value of the register EAN is 126 in step S2, the AUX send level of the channel assigned to the c-th channel strip 20 has been assigned to the rotary encoder 24. Thus, in step S3, the value of the AUX send level of the channel is updated in accordance with the manipulation amount and the processing ended, in which the bus whose value is to be updated depends on the value of the register AUXN.

On the other hand, when the value is other than 126 in step S2, the processing proceeds to step S4. When the value of the register EAN is other than 43 in step S4, the parameter in accordance with the value of the EAN of the channel assigned to the c-th channel strip 20 has been assigned to the rotary encoder 24. Thus, in step S5, the value of the parameter is updated and the processing is ended.

Alternatively, when the value is 43 in step S4, the parameter of the fader of the channel assigned to the c-th channel strip 20 in the reverse layer has been assigned to the rotary encoder 24 as described above. Thus, in steps S6 and S7, the value of the fader is updated, and the processing is ended.

In the above processing, the CPU 11 functions as the parameter editor in steps S3, S5, and S7.

By performing such processing, it is possible in this mixer to control by the rotary encoder 24 included in a channel strip 20 not only the parameter of the channel assigned to the channel strip 20 in the selected layer but also the parameter of the channel assigned in the reverse layer. Accordingly, the parameter in the reverse layer can be controlled without switching between layers every time, resulting in improved operability. Further, since there is only one channel assigned in the reverse layer as choices of other channels, a user easily recognizes which channel is the other channel whose parameter the user is operating by the rotary encoder 24 of each channel strip 20.

It should be noted that the parameter in the reverse layer controllable by the rotary encoder 24 is only the parameter of the fader here, but another parameter may be made controllable. Further, a plurality of parameters may be made controllable.

As a matter of course, the configuration and the operation method of the mixer and its console are not limited to those of the above-described embodiment.

Furthermore, the invention is also applicable to a digital mixer constituted using a so-called digital audio work station (DAW) having a configuration that a computer such as a personal computer (PC) is permitted to execute required software to have an audio signal processing function and its action is controlled using a physical controller.

Furthermore, the invention is also applicable to various audio signal processing devices having similar channel strips, in addition to the digital mixer.

As has been described, according to the digital mixer of the invention, it is possible to control by the control of one channel strip not only the parameter of the channel assigned to the channel strip but also the parameter of the channel assigned in the reverse layer. Accordingly, operability of the digital mixer is improved.

The present disclosure relates to subject matter contained in priority United Kingdom Patent Application No. 0321102.6, filed on Sep. 9, 2003, the content of which is herein expressly incorporated by reference in its entirety.

TABLE 1

| Event | Register | Value to be Set |
|---|---|---|
| Direction of assignment to n-th assignable key | EA (n) | Number of assigned parameter |

TABLE 1-continued

| Event | Register | Value to be Set |
|---|---|---|
| i-th assignable key ON | EAN | EA (i) |
| AUX key ON | EAN | 126 |
| PAN key ON | EAN | 127 |
| j-th layer selection key ON | LN | j |
| k-th AUX selection key ON | AUXN | k |

TABLE 2

| Register | Setting Contents |
|---|---|
| EA (n) | Number of parameter assigned to n-th assignable key |
| CH (x, y) | Number of channel assigned to y-th channel strip in x-th layer |
| EAN | Number of parameter assigned to rotary encoder |
| LN | Number of selected layer |
| ULN | Number of reverse layer of selected layer |
| AUXN | Number of AUX bus whose send level is to be controlled in accordance with operation of rotary encoder when send level is assigned to the rotary encoder |
| buf | Manipulation amount of rotary encoder |

TABLE 3

| Number | Parameter |
|---|---|
| 0 | No Assign |
| 1 | Attenuator |
| 2 | Input Patch |
| . | . |
| . | . |
| . | . |
| 42 | Scene Fade Time |
| 43 | Alt Layer |
| 44 | External AD Gain |
| . | blank |
| . | |
| . | |
| 126 | AUX Send Level |
| 127 | Pan |

What is claimed is:

1. A digital mixer, comprising:

a bus for mixing signal inputted thereto;

a plurality of channels, each of which controls at least one of an amplitude and a frequency characteristic of an inputted signal based on values of a plurality of parameters and outputs the characteristic-controlled signal;

a plurality of channel strips provided on a console of the mixer, wherein each channel strip includes a level control and at least one rotary encoder;

a plurality of layers, each of which defines a set of channels to be assigned to the plurality of channel strips amongst the plurality of channels of the mixer, wherein every adjoining two of the layers are paired;

a first assignor which receives an obverse layer selection from a user, selects one of said layers as an obverse layer in accordance with said obverse layer selection, and assigns the set of channels defined by the obverse layer to the plurality of channel strips;

a second and a third assignor that receive a parameter selection from the user, and select one of the plurality of parameters for the selected obverse layer and one of the plurality of parameters for a reverse layer that is paired with the selected obverse layer, wherein only one of the second and third assignors assigns to each rotary encoder the selected parameter, wherein the second assignor assigns to the rotary encoder the selected parameter for the obverse layer and the third assignor assigns to the rotary encoder the selected parameter for the reverse layer; and a parameter editor which changes, in accordance with operation of a rotary encoder provided on a channel strip, a value of the parameter assigned to the rotary encoder by said only one of the second and third assignors, said assigned parameter belongs to one of the channel of the observe layer, assigned to the channel strip by the first assignor, and the channel of the reverse layer corresponding to the assigned channel of the observe layer, and changes, in accordance with operation of the level control provided on the channel strip, a value of a level parameter belonging to the channel of the obverse layer assigned to the channel strip by the first assignor.

2. A digital mixer, comprising:

a bus for mixing signal inputted thereto;

a plurality of channels, each of which controls at least one of an amplitude and a frequency characteristic of an inputted signal based on values of a plurality of parameters and outputs the characteristic-controlled signal;

a plurality of channel strips for controlling respective channels, each strip including a level control and a parameter encoder;

a plurality of layers, each of which defines a set of channels to be assigned to the plurality of channel strips amongst the plurality of channels of the mixer, wherein every two layers corresponding to (2n−1)-th and 2n-th layers, wherein n is a natural number, in the plurality of layers are paired;

a first assignor that receives an obverse layer selection from a user, selects one of said plurality of layers as an obverse layer in accordance with the obverse layer selection, and assigns the set of channels defined by the obverse layer to the plurality of channel strips;

a second and a third assignor that receive a parameter selection from the user, and select one of the plurality of parameters for the selected obverse layer and the plurality of parameters for a reverse layer that is paired with the selected obverse layer, wherein only one of the second and third assignors assigns to each rotary encoder the selected parameter, wherein the second assignor assigns to the rotary encoder the selected parameter for the obverse layer and the third assignor assigns to the rotary encoder the selected parameter for the reverse layer; and a parameter editor which changes, in accordance with operation of a parameter encoder provided on a channel strip, a value of the parameter assigned to the parameter encoder by said only one of the second and third assignors, said assigned parameter belongs to one of the channel of the observe layer, assigned to the channel strip by the first assignor, and the channel of the reverse layer corresponding to the assigned channel of the observe layer, and changes, in accordance with operation of a level control provided on the channel strip, a value of a level parameter belong to the channel of the obverse layer assigned to the channel strip by the first assignor.

3. A digital mixer according to claim 2 wherein the parameter encoder is a rotary encoder.

* * * * *